S. SULLIVAN.
Mode of Applying Sample-Patch to Cotton-Bales.
No. 166,158. Patented July 27, 1875.
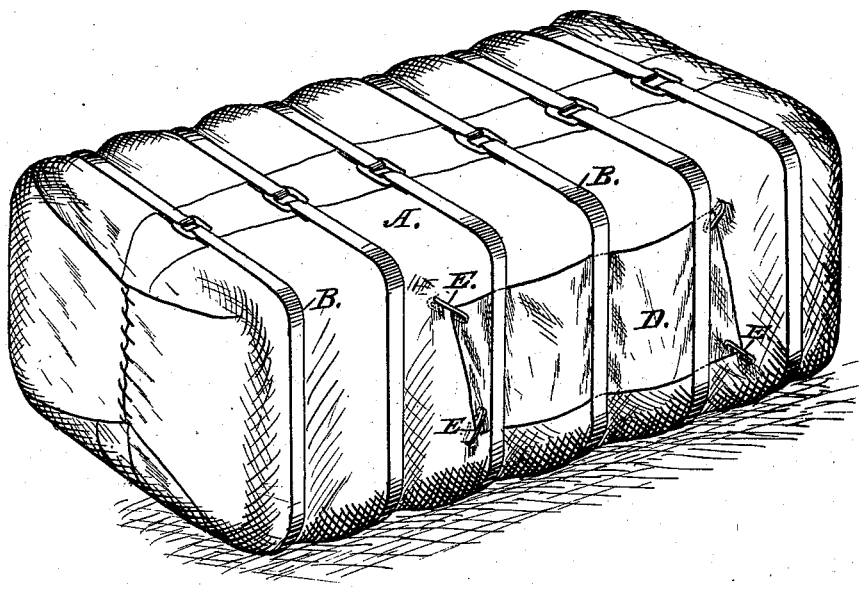
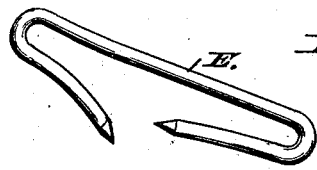
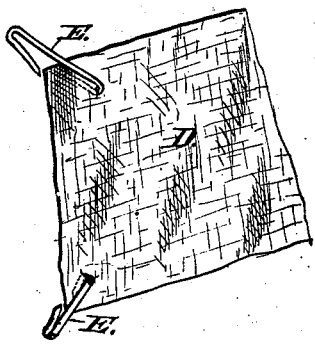
Attest:
H. L. Perrine.
Jos. L. Coombs
Inventor.
Swan Sullivan,
By James L. Norris.
Atty.

UNITED STATES PATENT OFFICE.

SWAN SULLIVAN, OF SAVANNAH, GEORGIA.

IMPROVEMENT IN MODES OF APPLYING SAMPLE-PATCHES TO COTTON-BALES.

Specification forming part of Letters Patent No. 166,158, dated July 27, 1875; application filed July 14, 1875.

*To all whom it may concern:*

Be it known that I, SWAN SULLIVAN, of Savannah, in the county of Chatham and State of Georgia, have invented certain new and useful Improvements in Mode and Means for Applying Patches to Cotton-Bales, of which the following is a specification:

This invention relates to certain new and useful improvements in attaching and securing cotton-patches to cotton-bales.

Such patches are commonly employed to cover the sample-holes of cotton-bales, to protect the cotton and to identify the same. They are usually secured simply by means of the binding-bands being applied to the bale just before being pressed, the bands being subsequently pressed over them, so as to hold them in place. As thus secured, they are liable to be stripped off or removed, consequent upon the rough usage to which the bales are ordinarily subjected in handling, rendering them useless for the objects for which they were intended.

The present invention is designed to furnish a means for overcoming these objections; and it consists in a hook or fastening adapted to receive the sample-patch at its corners, and fasten the same to the covering of the bale, in such manner as to securely hold it in place should the binding-bands be shifted or become detached from the bales.

In the drawing, Figure 1 represents a perspective view of a cotton-bale with the sample-patch secured by my improved device, and Fig. 2 represents a detached view of the device.

The letter A represents a cotton-bale as ordinarily made up, and B the binding or packing bands by which the same is secured. D represents the sample-patch of the ordinary construction. Through each corner of said patch is hooped one end of a fastening device, E, the other end of the same being hooked into the outer covering of the bale, drawing the corners down closely to the same, and securely fastening the patch to the bale. Said hook may be of any desired construction, and may be formed of any desired material. In the present instance it is shown as consisting of a wire bent into a hook at each end, the extremities being sharpened, so that they may be readily inserted into the fabric.

It will be seen that by the use of this fastening device the patch is securely fastened to the bale independently of the binding-bands by which said bale is held together, and should the bands break or become shifted the patch will be held securely in place.

It will be evident that no amount of rough handling will displace the patch as thus secured, since the corners of the same are kept close to the outer covering of the bale, holding the edges down, so that they cannot be torn or ripped up.

Having thus described my invention, what I claim, and desire to secure by Letters Patent, is—

A device for securing sample-patches to cotton-bales, consisting of a hook or fastening-clamp adapted to hold the corners of the same, and secure them to the outer covering of the bale, substantially as described.

In testimony that I claim the foregoing I have hereunto set my hand in the presence of the subscribing witnesses.

SWAN SULLIVAN.

Witnesses:
WM. D. HARDEN,
E. J. ACOSTA, Jr.